3,090,709
PHOSPHATE COATING OF METALS
John A. Henricks, Lakewood, Ohio, assignor, by mesne assignments, to The Lubrizol Corporation, Wickliffe, Ohio, a corporation of Ohio
No Drawing. Filed Aug. 10, 1953, Ser. No. 373,449
10 Claims. (Cl. 148—6.15)

This invention relates to phosphate coating of metals; more particularly, to improved accelerating and non-sludging zinc phosphate coating baths and to procedures for preparing and using the same for the production of improved protective and paint retaining coatings on metals.

An object of the invention is to provide improved compositions, and procedures for preparing and employing the same, for the production of zinc containing mixed phosphate coatings upon metals, which coatings are characterized by the substantial absence of crystalline structure therein whereby a more uniform and complete protective coverage of the coated metal is effected for a given weight of coating, and a smoother base is produced for paint or the like thereby enhancing the gloss of the latter.

Another object of the invention is to provide improved coating solutions and methods of preparing the same such that the solutions are substantially non-sludging, the coating rate is accelerated and the coating produced upon metals treated therewith is of the amorphous type integrally bonded to the metal.

A further object of the invention is to provide a process for accelerating the coating rate and inhibiting the formation of crystals in coatings produced by highly ionized baths of the zinc phosphate type.

An additional object of the invention is to provide a process for effecting a chromic rinse of phosphate coatings which does not damage the coating and which is especially effective with coatings of the amorphous type.

Another object of the invention is the provision of improved coating compositions and methods of preparing and using the same wherein the coating anion is the phosphate radical and the major part of the coating cations are provided by one or more soluble salts of zinc and of a metal selected from the group consisting of lithium, beryllium, magnesium, calcium, strontium, cadmium and barium, and wherein the rate of coating is accelerated by a nitrate, the quantity of the salt of a metal from said group being sufficient to substantially inhibit formation of crystals in the coatings produced by the compositions.

A further object of the invention is to provide coating compositions and methods as defined in the preceding paragraph and wherein the compositions contain a minor quantity of ferrous iron in solution.

Another object of the invention is to provide coating compositions and methods as defined in the preceding paragraph wherein further acceleration and limitation of the quantity of ferrous iron in solution are obtained by periodic additions of a neutralizing oxidizer selected from the group consisting of sodium nitrite, barium nitrite and calcium hypochlorite.

An additional object of the invention is the provision of improved zinc phosphate coating compositions and methods of preparing and using the same in which acceleration is provided and coating crystallization inhibited by the presence in the composition of a nitrate selected from the group consisting of the nitrates of lithium, beryllium, magnesium, calcium, strontium, cadmium and barium and assisted by traces of other metals selected from the group consisting of the amphoteric metals that will form the coordinating atom of a hetero-poly acid.

A further object of the invention is the provision of methods for employing zinc dihydrogen phosphate, or coating formulations based thereon, to provide improved highly ionized phosphate coating compositions capable of forming an amorphous coating on metal surfaces.

The invention also has an object thereof the provision of a ferrous metal article covered by an integral coating of the amorphous type which is a mixed phosphate composed principally of zinc and one of the metals selected from the group consisting of lithium, beryllium, magnesium, calcium, strontium, cadmium and barium.

Other and further objects and advantages of the invention will hereinafter be apparent from the following detailed description of the novel compositions and the procedures for preparing and using the same.

It is now customary to provide a phosphate coating upon metals, especially upon ferrous metals, which are to be painted or enamelled, this practice being almost universally employed in the automotive and household appliance industries.

The majority of zinc phosphate coating compositions in use for this purpose at the present time are prepared by dissolving various zinc dihydrogen phosphate mixtures in water together with phosphoric acid and various oxidizers or other additives, the solutions being then diluted with water and heated to provide a dilute aqueous solution which is nearly saturated with respect to the dissolved metallic phosphate. The solutions thus prepared are then "broken in" by employing them to coat a quantity of ferrous metal during which time the composition of the bath may be adjusted, if necessary, to provide "a balanced bath" the acidity of which is generally expressed in terms of its "ratio" of total to free acid and which may be in the order of from 5 to 40 depending upon whether the bath is to be employed for immersion or spraying of articles. The acidity of phosphate coating baths may also be expressed in terms of their "point" content as, for example, "a 15 point bath," which is an expression of the total acid content of the bath.

Baths of the nature just mentioned are employed by contacting the work to be coated therewith, either by immersion or spraying, and the coating deposited on the work is generally a combination of zinc and iron phosphates deposited by electrochemical action. The coating thus obtained consists chiefly of rather coarse crystals of the tertiary zinc phosphate, $Zn_3(PO_4)_2 \cdot 4H_2O$ overlaying some ferrous phosphate at the metal interface and require about 30 minutes at 200° F. in an immersion bath to complete the coating. Such a crystalline coating should have a weight of at least 6000 milligrams per square foot of coated area so that there will be sufficient overlapping of the crystals to ensure complete coverage of the surface. However, the usual specifications for coatings to be employed under paint or the like in the automotive industry calls for a minimum of 150–200 milligrams of coating per square foot of surface, this low weight being due to a desire to conserve paint, secure good paint adhesion without sacrificing flexibility of the metal, and secure high paint luster all of which features are difficult to achieve with a heavy crystalline coating. The coatings produced to meet such specifications consist of islands of isolated zinc phosphate crystals in a sea of iron phosphate conversion coating. Consequently, the corrosion protection obtained from such coating is limited to that afforded by the iron phosphate conversion coating between the crystals of zinc phosphate and which is less than that provided by a continuous coating of zinc phosphate.

In my prior patent application, Serial No. 271,930, filed February 16, 1952, now abandoned, improved coating baths and methods of preparing and using the same are disclosed wherein the coating rate is accelerated and the size of the crystals in the coating are reduced by providing all of the constituents of the compositions in highly soluble form and in proportions to produce a zinc ortho-phosphate. These improved compositions and methods provide coatings which are distinct improvements over those produced by the dihydrogen phosphate compositions but are still primarily crystalline in nature.

In accordance with this invention, the improvements in coating compositions and procedures obtained as disclosed in the aforementioned copending application are retained while the nature of the coating produced is altered by inhibiting the growth of crystals therein so that the result is a substantially amorphous coating of a hard slate-like finish integrally bonded with the material on which the coating is formed. This improved coating, by virtue of its smooth finish, resulting from lack of appreciable crystalline structure, permits the article thus coated to be severely flexed and/or distorted with no flaking or loss of bond between the article and its coating. Moreover, the smooth surface of the coating provides an excellent base for paint and like finishes so that the gloss of such a finish is substantially enhanced. Further, the protection afforded for a given weight of coating is increased by the amorphous nature of the improved coatings since a more uniform coverage is provided with less likelihood of minute openings such as occur between the crystals of conventional crystalline-type coatings.

The aforementioned coating acceleration and inhibition of crystalline formation in the improved coatings may be achieved by adding to coating compositions, formulated from phosphate anion and zinc cation yielding materials, a nitrate, and a soluble salt of a metal selected from the group consisting of lithium, beryllium, magnesium, calcium, strontium, cadmium, and barium. Preferably, the said soluble salt is the nitrate, in which event, no separate nitrate need be added. The resulting acceleration of the coating composition is such that complete coating of a metal surface can be effected in from 3 to 5 minutes with an immersion bath at a temperature in the order of 200° F. in contrast to the 30 minutes required for coating by a conventional zinc dihydrogen phosphate bath and 10 minutes when conventional coating baths are modified by additions of zinc or sodium nitrate. Moreover, the coating produced from baths of the dihydrogen phosphate type, or those modified by the addition of zinc or sodium nitrate, are crystalline in nature while the coatings, produced from baths to which a salt of lithium, beryllium, magnesium, calcium, strontium, cadmium or barium has been added, in at least the minimum quantities hereinafter specified, have a smooth texture exhibiting no visible crystal structure even when examined under magnification of 100 diameters. Furthermore, the chemical analysis of these amorphous-type coatings reveals that they are mixed phosphates with the metal of the recited group occurring therein in the ratio of about ½ mol thereof to each mol of zinc; the composition of the coating when calcium is used, for example, being $Zn_2Ca(PO_4)_2$. Electronic diffraction anallyses of the coatings indicates they are apatitic in nature. Thus, such analysis of a coating produced on low carbon steel by a bath prepared in accordance with this invention and containing calcium and chlorine showed the coating to be amorphous and have a diffraction pattern of an apatite with the pattern slightly distorted by the presence of zinc and iron.

The exact mechanism by which the additive metal and nitrate ions inhibit crystalline growth is not known, but it is believed that the cololidal insoluble phosphate of the modifying nitrate interferes with normal crystal growth of the zinc phosphate in a manner equivalent to the brightening action of colloids like gelatin in an electroplating bath. Thus, when a high concentration of barium nitrate is added to a zinc phosphate bath, a slimy gelatinous film is seen to envelop the iron or steel workpieces placed therein as the free acid in the vicinity of the work is used while the coating proceeds. This gelatinous film enveloping the metal surface in such a high barium zinc phosphating bath can be identified as barium phosphate.

It has also been observed that solutions of lithium, beryllium, magnesium, calcium, strontium, and barium acid phosphates per se do not coat out these metals as phosphates thereof similar to the manner in which zinc or manganese acid phosphate solutions coat out the latter metals. Thus, when steel is treated in acid phosphate solutions of the lithium, beryllium, magnesium, calcium, strontium, and barium phosphates without zinc but otherwise equivalent to the commercial zinc phosphate coating baths, the steel is covered chiefly with an iron phosphate coating and not a phosphate containing the lithium, beryllium, magnesium, calcium, strontium, or barium which is present in the bath. It appears therefore that it is only in the presence of a zinc phosphate coating composition that the lithium, beryllium, magnesium, calcium, strontium, and barium phosphates act as true coating chemicals. While cadmium may be employed as a coating, coating thereof from a phosphate bath is facilitated by the presence of zinc in the bath. Hence, in employing this invention, a zinc phosphate coating bath is employed and balanced with a soluble salt of lithium, beryllium, magnesium, calcium, strontium, cadmium or barium and a nitrate so that there is a co-deposit of lithium or other modifying metal phosphate in the uniform non-crystalline coating formed on the work. As mentioned above, the said soluble salt of the additive metal is preferably the nitrate thereof so it is not necessary to separately add nitrate to the composition.

The compositions prepared in accordance with this invention are preferably based upon nitrate depolarized formulations prepared from phosphoric acid or highly soluble phosphates and highly soluble salts of zinc in proportions equivalent to an orthophosphate of zinc. Since the ingredients are all readily soluble, the hydrolysis and sludge forming defects of the conventional dihydrogen phosphate compositions are avoided and, moreover, the ratio of zinc to phosphoric acid is not limited by considerations of solubility. Consequently, nearly any degree of zinc supersaturation is possible up to 10 mols of zinc to each mol of phosphoric acid, and in low zinc content formulations, the ratio may be as low as one unit of zinc salts to four units of phosphoric acid, as is disclosed and claimed in my aforementioned copending application, Ser. No. 271,930, now abandoned. In the simplest of such formulations the zinc is all provided as zinc nitrate but the desired zinc saturation may be secured by providing at least a part of the zinc in the form of zinc chloride with the range of balance being from 10 units of zinc nitrate to 1 unit of zinc chloride, in a high nitrate formulation, to 1 unit of zinc nitrate to 3 units of zinc chloride, in low nitrate formulations. The chloride acts to improve the non-sludging characteristics of the bath and also effects coating at a faster rate than baths which have all of the zinc in the form of the nitrate. Ammonium yielding substances may also be incorporated, as for example, by employing ammonium phosphate directly in the preparation of the composition or by utilizing other substances therein which will facilitate the production of the ammonium radical as is fully disclosed in the aforementioned copending application Ser. No. 271,930.

As mentioned above, the addition of a soluble salt of lithium, beryllium, magnesium, calcium, strontium, cadmium, and barium to one of the nitrate depolarized formulations of the type mentioned acts to accelerate the coating rate and inhibit crystalline growth, the extent of crystalline inhibition depending upon the amount of the additive metal employed. By way of example a 20 to 30 point bath zinc orthophosphate is prepared by diluting, to a 2 to 3% solution, a concentrate containing:

| Chemical | Units | Percent composition |
|---|---|---|
| Phosphoric acid, $H_3PO_4$ | 98×0.2 | 19.6 |
| Mono-ammonium phosphate, $(NH_4)H_2PO_4$ | 115×0.2 | 23.0 |
| Zinc chloride, $ZnCl_2$ | 136×0.1 | 13.6 |
| Zinc nitrate, $Zn(NO_3)_2$ | 189×0.1 | 18.9 |
| Water added to dissolve salts | | 24.9 |
| Total | | 100.0 |

This solution is then broken in and balanced to provide a 20 to 30 point bath by a trial load of ferrous articles thereby providing iron ions in the bath. To the balanced and broken in bath there is added a nitrate of lithium, beryllium, magnesium, calcium, strontium, cadmium, or barium in quantities approaching equimolarity with the zinc. The bath is then ready for use.

The amount of modifier metal which should be added to produce an amorphous coating is not exactly stoichiometric since some of the low molecular weight materials like lithium and magnesium nitrates must be added in greater quantities than the nitrates of the heavier elements such as barium. However, in each case, there appears to be a minimum amount of the modifier which must be added to effect substantial elemination of zinc phosphate crystalline structure. This amount may be defined as the "threshold value" of the modifier and these values as determined for commercial grade materials employed in a broken-in, 25 point bath, compounded as explained above, containing 3.2 grams per liter of zinc and 0.5 grams per liter of iron, are substantially as follows:

| Nitrate | Mol. weight | Concentration required, gr./liter | Mol. percent |
|---|---|---|---|
| Lithium nitrate | 69 | 12.3 | 18 |
| Beryllium nitrate | 187 | 9.3 | 5 |
| Magnesium nitrate | 256 | 25.6 | 10 |
| Calcium nitrate | 232 | 7.8 | 3 |
| Strontium nitrate | 212 | 14.1 | 6 |
| Cadium nitrate | 308 | 30.8 | 10 |
| Barium nitrate | 261 | 5.2 | 2 |

The above specified threshold values are based upon technical or commercial grade nitrates which contain traces of other metals as impurities. For example, the calcium nitrate was found to have at least traces of strontium and magnesium. Lithium nitrate was found to have at least traces of aluminum, tin, and strontium; cadmium nitrate contained traces of strontium, fluorine, iron, aluminum and magnesium; and barium nitrate contained traces of cerium, titanium and calcium. These trace impurities have also been detected in the coatings by spectrographic analysis and they evidently have an auxiliary or synergist action in inhibiting crystalline growth since the threshold concentrations of the modifier is materially less when employing commercial grades of the modifier material than when chemically pure grades of the modifiers are employed. While the above listed threshold values have been given for baths containing 3.2 grams per liter of zinc, substantially the same values are valid for baths ranging in zinc content from 1 to 4 grams per liter.

The required amount of the modifying metal salt to produce the amorphous coating may be reduced by the additional smoothing effect of minor amounts of other materials. For example, the elements known as the amphoteric metals and which furnish the central co-ordinating atom in the formation of heteropoly acids, as is discussed in "Inorganic Chemistry" by Fritz Ephraim, 4th Edition, pages 500 to 509, may be so used. Of such elements, which include phosphorous, arsenic, antimony, boron, thorium, silicon, tin, cerium, titanium, cobalt, zirconium, iron, vanadium, aluminum, copper, manganese, chromium, iodine and germanium, those are preferred which do not form an immersion deposit on iron or do not tend to poison the bath by preventing depositing of zinc phosphate. Besides iron, the safest auxiliary modifying agents are the soluble salts of cerium, zirconium, vanadium and titanium, these being utilized in concentrations of less than 1 gram per liter of the bath. In addition, trace amounts of antimony and arsenic, which form immersion coatings of the iron but do not accelerate electrolytic corrosion of the iron, may be employed.

Although minor amounts of the additive substances mentioned may be employed for securing synergistic action in obtaining non-crystalline zinc phosphate coatings, it is presently preferred to simply employ commercial grade nitrates of lithium, beryllium, magnesium calcium, strontium, cadmium or barium thereby taking advantage of the trace impurities therein. Likewise, the iron, acquired in normal operation of commercial phosphating baths when coating ferrous surfaces, assists in the formation of the desired coating although the concentration of this iron should not exceed 1 gram per liter.

The iron concentration does not materially increase during normal working of the bath with ferrous articles probably because of the oxidizing action caused by the air and by the interaction of the nitrate and chloride of the zinc salts as is explained in my aforementioned copending application, Ser. No. 271,930. However, in heavily worked baths, such as spray installations for ferrous articles where the iron concentration tends to increase, such increase may be controlled by the periodic addition of barium or sodium nitrite, or calcium hypochlorite, in amounts of less than 1 gram per liter. Such additions of neutralizing oxidizers do not throw out the usual voluminous flocculant ferric phosphate precipitates such as would occur in a zinc dihydrogen phosphate bath. On the contrary, the bath remains clear but turns a yellow to brown color which is considered indicative of the presence of an iron nitrosyl complex. It should also be mentioned that the aforementioned oxidization is solely for the purpose of acceleration and reduction of ferrous iron to thereby maintain a smooth armorphous coating through aoviding depositing of coarse iron phosphate crystals. There is no need to effect oxidization of hydrogen in baths compounded in accordance with this invention since the high nitrate content thereof provides adequate depolarization.

Although the addition of nitrates of lithium, beryllium, magnesium, calcium, strontium, cadmium or barium to a zinc orthophosphate composition has been heretofore described specifically with reference to a bath compounded from a concentrate containing phosphoric acid, mono-ammonium phosphate, zinc chloride and zinc nitrate in the proportions stated above, it is to be unedrstood that baths compounded from any of the formulations set forth in my aforementioned copending application, Ser. No. 271,930 may be employed in similar manner. The following may be mentioned as further examples of suitable concentrates for such formulations:

| Chemical | Units | Percent composition |
|---|---|---|
| Phosphoric acid, $H_3PO_4$ | 98×0.4 | 39.2 |
| Zinc nitrate, $Zn(NO_3)_2$ | 190×0.2 | 38.0 |
| Water added to dissolve salts | | 22.8 |
| Total | | 100.0 |
| Phosphoric acid, $H_3PO_4$ | 98×0.3 | 29.4 |
| Zinc nitrate, $ZN(NO_3)_2$ | 190×0.2 | 38.0 |
| Mono-ammonium phosphate, $(NH_4)H_2PO_4$ | 115×0.1 | 11.5 |
| Water added to dissolve salts | | 21.1 |
| Total | | 100.0 |
| Phosphate acid, $H_3PO_4$ | 98×0.3 | 29.4 |
| Zinc chloride, $ZnCl_2$ | 136×0.15 | 20.4 |
| Zinc nitrate, $Zn(NO_3)_2$ | 189×0.15 | 28.4 |
| Water added to acid to dissolve salts | | 21.8 |
| Total | | 100.0 |
| Phosphoric acid, $H_3PO_4$ | 98×0.2 | 19.6 |
| Zinc chloride, $ZnCl_2$ | 136×0.1 | 13.6 |
| Zinc nitrate, $Zn(NO_3)_2$ | 189×0.2 | 37.8 |
| Water added to acid to dissolve salts | | 29.0 |
| Total | | 100.0 |
| Phosphoric acid, $H_3PO_4$ | 98×0.25 | 25.0 |
| Ammonium nitrate, $NH_4NO_3$ | 80×0.25 | 20.0 |
| Zinc chloride, $ZnCl_2$ | 136×0.25 | 34.0 |
| Water added to dissolve salts | | 21.0 |
| Total | | 100.0 |

As mentioned in the above described detailed example of the preparing of a bath to provide an amorphous coating on a metal surface, any of the concentrates is preferably first diluted to provide the desired bath strength and the bath broken in. Thereafter the nitrate of lithium, beryllium, magnesium, calcium, strontium, cadmium or barium is added thereto. It is however possible to incorporate the necessary quantity of the modifier nitrate in the concentrate so that it is present when the concentrate is diluted to provide the bath and does not need to be added as a separate step. When so added the quantities of the modifier nitrate to produce amorphous coatings are such that, when the concentrate is diluted to bath strength, the said modifier nitrate will be present in at least the threshold value specified above.

It is also possible to adapt conventional zinc dihydrogen phosphate compositions to production of amorphous mixed phosphate coatings by modifying the compositions so that they are equivalent to ionized salt-based baths of phosphoric acid, zinc nitrate and ammonium phosphate. Such a modified composition in the form of a concentrate may have the following constituents:

Chemical: Percent composition
Zinc dihydrogen phosphate concentrate
 (12% Zn, 48% $PO_4$) _____ 68.0
Zinc chloride_____ 6.0
Hydrochloric acid (37%, 22° Bé.)_____ 8.0
Ammonium nitrate_____ 13.5
Water _____ 4.5
                                          _____
                                          100.0

This composition is prepared by dissolving anhydrous zinc chloride in the zinc dihydrogen phosphate concentrate. The ammonium nitrate is dissolved in the water and hydrochloric acid and the resulting solution is added to the concentrate containing the zinc chloride. The resulting composition is then chemically identical with the concentrate in the first example but is more dilute. A more concentrated solution can be obtained by first warming the zinc dihydrogen phosphate solution, adding the hydrochloric acid thereto, and then dissolving the ammonium nitrate in the warm solution, without additional water, and with the zinc chloride added as the final step. Similar results can be obtained by employing nitric acid and ammonium chloride to convert the zinc chloride, zinc phosphate solution to the desired chemical composition and it will be obvious that other chemicals may be utilized for this purpose. It will also be evident that the order of adding and mixing the ingredients may be altered from those specifically mentioned.

The first example of a formulation for providing an amorphous mixed phosphate coating disclosed the addition of the nitrate of the modifier metal after the other ingredients, provided in the form of a concentrate, had been diluted to substantially bath strength. However, the nitrate of the modifier metal may also be included as part of the concentrate as, for example:

| Chemical | Units | Percent composition |
|---|---|---|
| Phosphoric acid, $H_3PO_4$ | 98×0.08 | 7.8 |
| Mono-ammonium phosphate, $NH_4H_2PO_4$ | 115×0.10 | 11.5 |
| Zinc chloride, $ZnCl_2$ | 136×0.04 | 5.5 |
| Zinc nitrate, $Zn(NO_3)_2$ | 189×0.06 | 11.3 |
| Calcium nitrate, $Ca(NO_3)_2$ | 164×0.14 | 23.0 |
| Water to dissolve | | 40.9 |
| Total | | 100.0 |

This concentrate was diluted to a 4% by volume solution, heated to 190–200° F. and was employed as a coating bath for a wide variety of articles including ferrous automobile wheels and rims, low carbon steel tubing prior to drawing, and die-cast zinc hardware. The bath was maintained at a 20 to 30 point strength and had a ratio of total to free acid of between 5–10 to 1. Coatings were produced by immersion of the cleaned work in the bath for a period of 4 to 8 minutes and the coatings so obtained were smooth and uniform, with no crystal structure visible under magnification of 100 diameters. These coatings provided an excellent undercoat for paint as well as affording excellent corrosion resistance when covered with lanolin or a wax type rust inhibiting film. In addition, the coatings also evidenced ability to hold a lubricant for subsequent drawing operations or for reduction of sliding friction.

The proportions of the ingredients in this concentrate may be varied from the presently preferred values stated above with the following ranges:

| Chemical | Units | Percent composition |
|---|---|---|
| Phosphoric acid, $H_3PO_4$ | 98×(0.04 to 0.12) | 2.6 to 8.0 |
| Mono-ammonium phosphate $NH_4H_2PO_4$ | 115×(0.02 to 0.15) | 1.5 to 11.7 |
| Zinc chloride, $Zn Cl_2$ | 136×(0.01 to 0.10) | 0.9 to 9.2 |
| Zinc nitrate, $Zn(NO_3)_2$ | 189×(0.02 to 0.10) | 2.5 to 12.3 |
| Calcium nitrate, $Ca(NO_3)_2$ | 164×(0.10 to 0.50) | 11.0 to 55.4 |

Thus such a concentrate, containing about one to about four parts of zinc ion and at least about 1.33 parts of calcium ion, as indicated earlier herein, will contain calcium and zinc in such proportions that the weight ratio of calcium to zinc is within the range of 0.31 to 10.2, and also the nitrate ion and phosphate ion in such proportions that the weight ratio of nitrate ion to phosphate ion is within the range of 0.58 to 13.0.

Amorphous zinc phosphate coatings can be obtained by spraying as well as by immersion, the chief difference in the baths being that the spray must have a lower free acid and can be run at a lower strength. For example, a spray bath needs only 10 to 20 total points but should have an acid ratio of from 15 to 50. The required low free acid may be initially obtained by neutralizing the free acid with zinc dust, zinc oxide or calcium carbonate, sodium or ammonium hydroxides or by sodium nitrite. The resulting acid balance does not change rapidly since the baths do not hydrolyze under continuous heating. Moreover, the crystal inhibiting salts are neutral and exert a buffer action to stabilize the bath against free acid formation. However, the low permissible free acid in spray formulations limits the solubility of the coating salts in the concentrate so that it is advisable to package the low acid zinc phosphate separately from the nitrate or other salt of lithium, beryllium, magnesium, calcium, strontium, cadmium or barium to avoid recrystallization of the ingredients.

An effective spray bath for producing an amorphous coating can be prepared from the following:

| Chemical | Units | Percent composition |
|---|---|---|
| A. Zinc salt concentrate: | | |
| Mono-ammonium phosphate, $NH_4H_2PO_4$ | 115×0.125 | 14.4 |
| Zinc dihydrogen phosphate, $ZnH_2(PO_4)_2$ | 261×0.125 | 32.6 |
| Ammonium chloride, $NH_4Cl$ | 53×0.125 | 6.6 |
| Water to dissolve | | 46.4 |
| Total | | 100.0 |
| B. Calcium Nitrate $Ca(NO_3)_2 4H_2O$ | 236×0.20 | 47.2 |
| Water to provide 66% calcium nitrate solution | | 23.6 |
| Total | | 70.8 |

The bath was prepared by mixing the above ingredients together and with water in quantities such that the resulting solution contains 1.5% by volume of the composition designated A above and 1% by volume of that designated B, the free acid being reduced by zinc dust in an amount in the order of 0.1% by weight of the zinc concentrate, A. The resulting bath analyzed 20 points, with a ratio of 25 total acid to 1 of free acid, and was maintained at a temperature in the order of 160–170° F. At this strength and temperature an amorphous mixed phosphate coating of 200 mg. per sq. ft. was produced on ferrous metals by spraying them for 1 minute. The bath was found by analysis to contain 2 grams per liter of zinc, 6 grams per liter of phosphate and 12 grams per liter of calcium nitrate, and was held at this level by a constant drip addition of both the concentrates designated A and B.

The proportions of the ingredients in the concentrates employed in compounding this bath may be varied from the presently preferred values stated above within the following ranges:

| Chemical | Units |
|---|---|
| Mono-ammonium phosphate, $NH_4H_2PO_4$ | 115×(0.05–0.20) |
| Zinc dihydrogen phosphate, $ZnH_2(PO_4)_2$ | 261×(0.05–0.25) |
| Ammonium chloride, $NH_4Cl$ | 53×(0.05–0.15) |
| Calcium nitrate, $Ca(NO_3)_2 4H_2O$ | 236×(0.10–0.50) |

Thus such concentrates, containing about one to about four parts of zinc ion and at least about 1.33 parts of calcium ion, as indicated earlier herein, will contain calcium and zinc in such proportions that the weight ratio of calcium to zinc is within the range of 0.25 to 6.1, and will contain phosphate ion and nitrate ion in such proportions that the weight ratio of nitrate ion to phosphate ion is within the range of 0.3 to 6.5.

Instead of packaging the zinc salts as one concentrate and the calcium nitrate as the second concentrate, both the zinc and calcium salts can be put together as one concentrate and the phosphate supplied separately as another concentrate. Thus:

| Chemical | Units | Percent composition |
|---|---|---|
| Salt concentrate: | | |
| Calcium nitrate, $Ca(NO_3)_2 4H_2O$ | 236×0.10 | 23.6 |
| Calcium chloride, $CaCl_2$ | 111×0.05 | 5.6 |
| Zinc nitrate, $Zn(NO_3)_2 6H_2O$ | 297×0.06 | 17.9 |
| Zinc chloride, $ZnCl_2$ | 136×0.04 | 5.5 |
| Diacetone alcohol, $C_6H_{12}O_2$ | 116×0.10 | 11.6 |
| Water to dissolve | | 35.8 |
| Total | | 100.0 |
| Phosphate concentrate: | | |
| Mono-ammonium phosphate, $NH_4H_2PO_4$ | 115×0.20 | 23.0 |
| Water to dissolve to 46% solution | | 27.0 |
| Total | | 50.0 |

A spray bath was prepared from these ingredients by making a 2% solution of the salt concentrate and then adding the phosphate concentrate in quantity to provide a 1% solution thereof. This bath had an acid ratio of 35 and a total of 25 points with optimum operation being effected with an acid ratio 30 to 50. Hence, it is desirable to make an occasional addition of zinc oxide or zinc dust to the operating bath. Amophous mixed zinc and calcium phosphate coatings were produced upon work sprayed for less than one minute by this bath when at a temperature in the order of 150 to 170° F. The diacetone alcohol is used as an organic accelerator in this bath and, in addition, prevents the accumulation of excess nitrate and chloride anions in the bath which, when greatly in excess of the phosphate anion, results in excessive attack of the metal to be coated. This is undesirable since not only may more weight of the base metal to be coated be lost than is gained from the coating formed thereon, but also the base metal will be in an active state, equivalent to pickled stock, and thus have inferior corrosion resistance. Other organic accelerators may be used in place of that mentioned above, for example, those discussed in my aforementioned copending application Ser. No. 271,930.

As mentioned heretofore, conventional zinc phosphate baths can be converted to provide an amorphous coating of a mixed phosphate and an example of how this may be accomplished has been given above. In general, it has been found that for best results the nitrate of lithium, beryllium, magnesium, calcium, strontium, cadmium or barium should be employed in an amount at least equimolar with the zinc phosphate and that an accelerating agent be used. The preferred accelerating agents are the neutralizing oxidizers such as sodium nitrite, calcium hypochlorite and barium nitrite which decompose in the bath to leave a neutralizing cation in solution after the gaseous oxidant is released. In preparing such a bath the following ingredients were employed:

| Chemical | Units | Percent Composition |
|---|---|---|
| A. Zinc phosphate concentrate: | | |
| Zinc dihydrogen phosphate, $ZnH_2(PO_4)_2$ | 261×0.22 | 57.4 |
| Zinc nitrate, $Zn(NO_3)_2 6H_2O$ | 297×0.02 | 5.9 |
| Water to dissolve | | 36.7 |
| Total | | 100.0 |
| B. Calcium nitrate, $Ca(NO_3)_2 4H_2O$ | 236×0.48 | 113.0 |
| C. Sodium nitrite, $NaNO_2$ (25% solution) | 69×0.08 | 5.6 |

The bath is prepared in cold solution containing 1.5% by volume of the zinc phosphate concentrate to which an equal weight of crystalline calcium nitrate is added after which sodium nitrite is introduced to provide in the order of 1 gram per liter. The make-up water of the bath may be hot rather than cold but in that event the calcium nitrate should be added first, after which the zinc phosphate concentrate is introduced thereby preventing hydrolysis of the latter. The calcium nitrate may be supplied in the form of a 65% solution but then the bath should be made up to a 3% by volume concentration of this ingredient and a 1.5% by volume concentration of the zinc phosphate concentrate. Such baths have an acid ratio of 20, with 20 points total acid, and, when operated at temperatures of from 130 to 160° F., produced amorphous mixed phosphate deposits. The initial sodium nitrite will normally be sufficient for several hours and is augmented thereafter by additions of 0.5 gram 1 liter whenever the coating shows a tendency towards crystal formation or when the coating is light in weight. Calcium hypochlorite, barium nitrite, or a mixture of sodium hydroxide and hydrogen peroxide may be employed as accelerators in place of sodium nitrite with essentially equivalent results with respect to the quality and weight of coating obtained. Baths of this nature were found, by analysis, to contain 3 grams per liter of zinc and 4 grams per liter of calcium and were maintained at this level by continuous additions of the zinc phosphate concentrate and calcium nitrate supplied through separate feed-pumps. The calcium nitrate for such additions may be made barely alkaline by means of ammonium hydroxide and about 3.5 grams per liter of sodium nitrite or calcium hydrochlorite added thereto so that the resulting concentrate furnishes both the crystal inhibitor and the accelerator.

The proportions of the ingredients employed in compounding this bath may be varied from the presently preferred values stated above within the following ranges:

| Chemical | Units |
| --- | --- |
| Zinc dihydrogen phosphate, $ZnH_2(PO_4)_2$ | 261×(0.11 to 0.33). |
| Zinc nitrate, $Zn(NO_3)_2 6H_2O$ | 297×(0.01 to 0.03). |
| Calcium nitrate, $Ca(NO_3)_2 4H_2O$ | 236×(0.36 to 0.64). |
| Sodium nitrite, $NaNO_2$ (25% solution) | 69×(0.02 to 0.12). |

Thus such a bath, containing about one to about four parts of zinc ion and at least about 1.33 parts of calcium ion, as indicated earlier herein, will contain calcium and zinc in such proportions that the weight ratio of calcium to zinc is within the range of 0.61 to 3.26 and will contain phosphate ion and nitrate ion in such proportions that the weight ratio of nitrate ion to phosphate ion is within the range of 0.75 to 4.0.

The above specific examples have employed a nitrate of lithium, beryllium, magnesium, calcium, strontium, cadmium or barium as an inhibitor of crystal formation in zinc phosphating formulations and other ingredients have been included to facilitate the coating formation. These are not, however, inflexible requirements since any zinc phosphate coating bath can be made to produce an amorphous mixed phosphate coating bath by employing a salt of one of the above-mentioned coating crystal inhibitor metals in the presence of a nitrate. Hence, it is not necessary that the nitrate of the crystal inhibitor metal be used since a different soluble nitrate, as for example ammonium nitrate, may be added if nitrate is not already present. Moreover, the nitrate may be supplied in combination with the zinc and/or the inhibitor metal may be employed as the phosphate thereof. Thus, satisfactory amorphous coatings were provided by immersion of ferrous articles in the following baths which were operated at temperatures near boiling and with a total acid of 25 points and a free acid of 4.

| Chemical | Units | Percent Composition |
| --- | --- | --- |
| Calcium phosphate, $CaH_2PO_4$ | 252×0.10 | 25.2 |
| Phosphoric acid, $H_3PO_4$ | 98×0.06 | 6.6 |
| Zinc nitrate, $Zn(NO_3)$ | 297×0.05 | 14.8 |
| Water to dissolve | | 53.4 |
| Total | | 100.0 |
| Calcium chloride, $CaCl_2$ | 100×0.15 | 16.5 |
| Mono-ammonium phosphate, $NH_4H_2PO_4$ | 115×0.15 | 17.2 |
| Zinc nitrate, $Zn(NO_3)$ | 297×0.07 | 22.2 |
| Phosphoric acid, $H_3PO_4$ | 98×0.07 | 6.9 |
| Water to dissolve | | 37.2 |
| Total | | 100.0 |

The last-mentioned bath operated satisfactorily but was improved by adding ammonium nitrate in the order of 8% of the concentrate.

The amount of the salt of the modifier metal, namely, lithium, beryllium, magnesium, calcium, strontium, cadmium or barium, which may be employed in baths formulated in accordance with this invention is not limited to the minimum or threshold values specified but may be increased when additional buffering action of the added base and the acceleration action of high nitrate concentration are desirable. For example, in formulations for use in spray type baths, the quantity of modifier salt may be two to three times the threshold value set forth. In such a case and in other relatively high concentrations of the modifier metal, the latter may be in greater concentration than the zinc in the modified bath and hence adjustments must be made in the bath to maintain balance and avoid sludge. This may be effected by adding phosphoric acid in amounts to provide a pH of from 2 to 3. Excessive nitrate in the bath may be avoided by employing the chlorides of zinc, lithium, beryllium, magnesium, calcium, strontium, cadmium or barium as part of the bath components rather than supplying all of these elements in the form of the nitrate.

It will also be understood that other modifications of the bath compositions can be effected to meet specific coating problems while still employing the principles of this invention. For example, the formulations of this invention may be employed to coat surfaces of metals other than iron although the specific examples given above refer primarily to formulations employed for coating ferrous articles. Where the metal coated is other than ferrous, the formulations may be suitably adapted to effect the desired coating by using nickel or iron salts for galvanic acceleration as is now well known and commonly employed in conventional phosphating baths. However, even without the addition of such galvanic accelerators, the baths of this invention provide a very satisfactory coating upon die cast zinc and upon commercial magnesium metal. A bath for coating magnesium, however, should be operated at room temperature and the immersion time kept below one minute.

The amorphous type coatings provided by the formulations herein described are more dense and uniform than crystalline coatings heretofore provided and therefore provide good corrosion resistance. Nevertheless, it is standard practice in certain industries to require a chromic acid rinse of phosphated articles, especially ferrous articles, as additional insurance against defects in the coverage provided by the coating and for other considerations which are not here important. The usual 2 to 5 grams per liter chromic acid rinse should not however be employed upon the amorphous type coatings effected as herein described since this will remove an appreciable amount of the coating. The desired passivation and insurance of paint adhesion resulting from a chromic rinse may however be secured by rinsing the coated surface, preferably while still wet, with a hot aqueous solution containing in the order 1–5 grams per liter of a dichromate of pyridine, piccoline and quinoline, the preferred concentration being less than 3 grams per liter and preferably is in the order of 1 to 2 grams per liter. These cyclic base chromates have unique properties as an inhibitory rinse after phosphate coating and do not damage an amorphous coating nor remove appreciable amounts thereof.

The utilization of nitrates of lithium, beryllium, magnesium, calcium, strontium, cadmium or barium in coating bath formulations not only accelerates the bath and provides an improved coating but also results in the production of a non-sludging bath in which the acid ratio does not rapidly change so that it is relatively easy to maintain the pH value of the baths substantially constant, the preferred value being 2.0–2.5 for an immersion bath and 2.5–4.0 for a spray bath. Hence, the baths do not require constant attention and modification. Moreover, the baths may be readily titrated by simple methods in common use and which are well understood by even semi-skilled workers so that the services of a skilled chemist are not needed.

The selection of the modifier salt is in part determined by its cost, in part by its relative effectiveness, and also by its possible toxic effect upon the operators. Thus, calcium nitrate is presently preferred because of its low cost, non-toxic nature and its relatively low threshold value in these formulations while barium nitrate, being still more highly effective, may be used in installations where its toxicity is not objectionable. Although relative cost, effectiveness in the formulations and possible toxicity are the more usual considerations in the selection of the modifier salts, it is to be understood that other considerations may also influence the choice of one or more of the modifiers. In this regard, it should be noted that more than one of the modifier salts may be employed in a single formulation and that, where more than one such modifier is employed in a given formulation, the minimum or threshold value for each will depend upon the total quantity of the modifiers utilized. It will be remembered, however, that amounts of the modifier salts greater than the minimum of threshold values may be safely employed with corresponding modification of the bath to secure and maintain the balance therein.

It will also be understood that although the amorphous coatings, produced by employing the modifier metal salts in quantities equal to or greater than the threshold value, reveal no crystalline structure under magnification of 100 diameters, nevertheless, somewhat lesser amounts of the modifier metal salts will produce coatings which are smooth in appearance and afford a continuous coverage of the coated metal. Such coatings are essentially non-crystalline in character, even though some vestiges of crystal form may be detected under magnification, and therefore the use of the term "amorphous" or "amorphous-type" in the subjoined claims is intended to include such coatings in the absence of other limitations. It will also be evident that modifications in the compositions and methods of preparing and using the same, other than those specifically heretofore mentioned, will be apparent to those skilled in the art and consequently the invention is not to be considered as limited to the substances and percentages thereof given in the specific examples except as may be required by the spirit and scope of the subjoined claims.

Having thus described the invention, I claim:

1. An aqueous solution, for use in producing an amorphous mixed phosphate coating on the surfaces of metals, containing essentially from about 0.06 to about 0.27 molar part of phosphate ion, from about 0.03 to about 0.20 molar part of zinc ion, from about 0.12 to about 0.60 molar part of nitrate ion, from about 0.10 to about 0.50 molar part of calcium ion and from about 0.02 to about 0.15 molar part of ammonium ion, said solution being characterized by a total acidity of about 10 to about 30.

2. An aqueous solution, for use in producing an amorphous mixed phosphate coating on the surfaces of metals, containing essentially from about 0.06 to about 0.27 molar part of phosphate ion, from about 0.03 to about 0.20 molar part of zinc ion, from about 0.12 to about 0.60 molar part of nitrate ion, from about 0.10 to about 0.50 molar part of calcium ion and from about 0.02 to about 0.15 molar part of ammonium ion, said solution being characterized by a total acidity of about 10 to about 30, said solution being substantially free from sulfate ion.

3. A composition for forming on metallic surfaces a protective coating exhibiting no visible crystal structure at a magnification of 100 diameters, said composition consisting essentially of an aqueous acidic solution containing about 1 to about 4 parts of zinc ion, at least about 1.33 parts of calcium ion, the weight ratio of calcium to zinc being within the range of 0.31 to 10.2, the phosphate ion and the nitrate ion, the weight ratio of nitrate ion to phosphate ion being within the range of 0.58 to 13.0.

4. The composition of claim 3 characterized further in that said aqueous acidic solution has a ratio of total acidity to free acidity within the range of from about 5 to about 50.

5. A composition for forming on metallic surfaces a protective coating exhibiting no visible crystal structure at a magnification of 100 diameters, said composition consisting essentially of an aqueous acidic solution containing about 1 to about 4 parts of zinc ion, at least about 1.33 parts of calcium ion, the weight ratio of calcium to zinc being within the range of 0.25 to 6.1, the phosphate ion and the nitrate ion, the weight ratio of nitrate ion to phosphate ion being within the range of 0.3 to 6.5.

6. The composition of claim 5 characterized further in that said aqueous acidic solution has a ratio of total acidity to free acidity within the range of about 5 to about 50.

7. A composition for forming on metallic surfaces a protective coating exhibiting no visible crystal structure at a magnification of 100 diameters, said composition consisting essentially of an aqueous acidic solution containing about 1 to about 4 parts of zinc ion, at least about 1.33 parts of calcium ion, the weight ratio of calcium to zinc being within the range of 0.61 to 3.26, the phosphate ion and the nitrate ion, the weight ratio of nitrate ion to phosphate ion being within the range of 0.75 to 4.0.

8. A composition for forming on metallic surfaces a protective coating exhibiting no visible crystal structure at a magnification of 100 diameters, said composition consisting essentially of an aqueous acidic solution of from 1 to 4 parts of zinc ion, phosphate ion and at least 1 metal nitrate selected from the group consisting of lithium nitrate, beryllium nitrate, magnesium nitrate, calcium nitrate, strontium nitrate, cadmium nitrate and barium nitrate, said metal nitrate being present in at least the following concentrations:

| | Parts |
|---|---|
| Lithium nitrate | 12.3 |
| Beryllium nitrate | 9.3 |
| Magnesium nitrate | 25.6 |
| Calcium nitrate | 7.8 |
| Strontium nitrate | 14.1 |
| Cadmium nitrate | 30.8 |
| Barium nitrate | 5.2 |

9. A solution for forming a protective coating on metallic surfaces which comprises an aqueous acidic solution consisting essentially of about 0.1–0.4% zinc ion, at least 0.132 calcium ion, the weight ratio of the calcium ion to the zinc ion being in the range of 0.25–4.5, the phosphate ion and the nitrate ion, the weight ratio of nitrate ion to phosphate ion being in the range of 0.5–4.35.

10. A solution for forming a protective coating on metallic surfaces which comprises an aqueous acidic solution consisting essentially of about 0.1–0.4% zinc ion, at least 0.132 calcium ion, the weight ratio of the calcium ion to the zinc ion being in the range of 0.25–4.5, the phosphate ion and the nitrate ion, the weight ratio of nitrate ion to phosphate ion being in the range of 0.5–4.35, said solution being substantially free from sulfate ion.

References Cited in the file of this patent

UNITED STATES PATENTS

| | | |
|---|---|---|
| Re. 24,017 | Henricks | June 7, 1955 |
| 1,291,352 | Allen | Jan. 14, 1919 |
| 1,939,421 | Tosterud | Dec. 12, 1933 |
| 1,957,354 | Prier | May 1, 1934 |
| 2,121,574 | Romig | June 21, 1938 |
| 2,312,855 | Thompson | Mar. 2, 1943 |
| 2,364,436 | Frisch et al. | Dec. 5, 1944 |
| 2,499,261 | Rosenbloom | Feb. 28, 1950 |
| 2,500,915 | Tanner | Mar. 14, 1950 |
| 2,514,941 | Drysdale | July 11, 1950 |
| 2,515,934 | Verner et al. | July 18, 1950 |
| 2,540,314 | Amundsen | Feb. 6, 1951 |
| 2,588,234 | Henricks | Mar. 4, 1952 |
| 2,597,406 | Thome-Johanessen | May 20, 1952 |
| 2,609,308 | Gibson | Sept. 2, 1952 |
| 2,628,175 | Henderson | Feb. 10, 1953 |
| 2,702,768 | Hyams et al. | Feb. 22, 1955 |
| 2,766,154 | Russell | Oct. 9, 1956 |

FOREIGN PATENTS

| | | |
|---|---|---|
| 310,756 | Germany | July 1, 1922 |
| 440,215 | Great Britain | Dec. 23, 1935 |